United States Patent
Barnhart (10) Patent No.: US 11,752,917 B2
(45) Date of Patent: Sep. 12, 2023

(54) MULTIPURPOSE COVER FOR VEHICLE CARGO AREAS

(71) Applicant: Kurt Barnhart, Gypsum, KS (US)

(72) Inventor: Kurt Barnhart, Gypsum, KS (US)

( * ) Notice: Subject to any disclaimer, the term of this patent is extended or adjusted under 35 U.S.C. 154(b) by 0 days.

(21) Appl. No.: 17/681,937

(22) Filed: Feb. 28, 2022

(65) Prior Publication Data

US 2022/0281373 A1    Sep. 8, 2022

Related U.S. Application Data

(60) Provisional application No. 63/242,729, filed on Sep. 10, 2021, provisional application No. 63/155,511, filed on Mar. 2, 2021.

(51) Int. Cl.
| | |
|---|---|
| *B60P 3/34* | (2006.01) |
| *B60J 7/14* | (2006.01) |
| *E04H 15/32* | (2006.01) |
| *E04H 15/08* | (2006.01) |
| *E04H 15/14* | (2006.01) |

(52) U.S. Cl.
CPC ............... *B60P 3/34* (2013.01); *B60J 7/141* (2013.01); *E04H 15/08* (2013.01); *E04H 15/14* (2013.01); *E04H 15/32* (2013.01)

(58) Field of Classification Search
CPC ....... B60J 7/14; B60J 7/141; B60J 7/16; B60J 7/1607; B60P 3/32; B60P 3/34; B60P 7/02; E04H 15/008
USPC .................................. 296/37.6, 100.02, 164
See application file for complete search history.

(56) References Cited

U.S. PATENT DOCUMENTS

| | | | | |
|---|---|---|---|---|
| 2,173,076 A | * | 9/1939 | Stetson | B60N 2/24 52/36.2 |
| 3,823,974 A | * | 7/1974 | Patnode | B60P 3/34 135/144 |
| 3,850,470 A | * | 11/1974 | Trelle | B60P 3/32 296/26.02 |
| 5,339,852 A | * | 8/1994 | Bull | B60P 3/38 49/40 |
| 5,769,191 A | * | 6/1998 | Cole, Jr. | F16F 9/54 188/312 |

(Continued)

FOREIGN PATENT DOCUMENTS

CN    112896027 A  *  6/2021    ............... B60J 7/16

OTHER PUBLICATIONS

English translation of CN 112896027; retrieved via PatentTranslate located atwww.epo.org. (Year: 2023).*

*Primary Examiner* — Jason S Daniels
(74) *Attorney, Agent, or Firm* — Brennan, Manna & Diamond, LLC (57)    ABSTRACT

This present invention relates to a vehicle cargo area or bed cover that forms an enclosed space for use in the vehicle bed. The cover is easy to install and remove for a single person and includes a series of lightweight panels, held together by framing elements and installed on the side rails of the truck bed. The lightweight panels are attached at the top to form the top panel. A rear panel is installed on top of the rear wall of the truck bed and an aerodynamic portion is positioned on the top of the cabin of the vehicle. The enclosure can be accessed by opening a door positioned on the tailgate or front end of the truck bed. The enclosure has LED lights for illumination and fans and windows for ventilation.

5 Claims, 6 Drawing Sheets

(56) References Cited

U.S. PATENT DOCUMENTS

| | | | | |
|---|---|---|---|---|
| 6,155,279 | A * | 12/2000 | Humphrey | B60P 3/32 |
| | | | | 52/143 |
| 6,945,589 | B2 * | 9/2005 | Quesenberry | B60J 7/106 |
| | | | | 296/43 |
| 10,501,002 | B2 * | 12/2019 | Graul | B60P 3/42 |
| 11,458,906 | B2 * | 10/2022 | Cullen | B60R 16/03 |
| 11,479,094 | B2 * | 10/2022 | Klein | B60J 7/026 |
| 2002/0140252 | A1 * | 10/2002 | Neville | B60P 3/341 |
| | | | | 296/164 |
| 2004/0189048 | A1 * | 9/2004 | Quesenberry | B60J 7/106 |
| | | | | 296/181.1 |
| 2022/0324371 | A1 * | 10/2022 | Dadone | B60P 3/34 |

* cited by examiner

MULTIPURPOSE COVER FOR VEHICLE CARGO AREAS

CROSS-REFERENCE TO RELATED APPLICATIONS

The present application claims priority to, and the benefit of, U.S. Provisional Application No. 63/155,511, which was filed on Mar. 2, 2021, and U.S. Provisional Application No. 63/242,729, which was filed on Sep. 10, 2021, both of which are incorporated herein by reference in their entirety.

FIELD OF THE INVENTION

The present invention relates generally to the field of accessories for vehicle conversions. More specifically, the invention relates to an easily installable, configurable and modular truck bed cover that does not create significant aerodynamic drag and provides an enclosed space for transporting cargo such as small vehicles and other items, as well as for performing work tasks such as when the vehicle is on a work site, or for sleeping and recreational activities. The cover features a series of lightweight panels installed on the truck bed and an aerodynamic portion installed on the top of the cabin or passenger compartment of the pickup truck. Accordingly, the present disclosure makes specific reference thereto. Nonetheless, it is to be appreciated that aspects of the present invention are also equally applicable to other like applications, devices and methods of manufacture.

BACKGROUND

By way of background, a pickup truck is a motorized vehicle that has an enclosed cab in which a driver and passengers sit, and an open cargo or storage area which is also referred to as the truck bed. The open cargo area is surrounded by the rear of the enclosed cab from one side, a hinged tailgate opposite thereto and side walls extending from the cab or front of the cargo area to the rear of the cargo area by the tailgate. The open cargo area of pickup trucks enables a wide variety of items to be hauled by such trucks and the cargo area to be used for other purposes.

It is a common observation that during normal operation, the cargo area is fully unattended and exposed, so that large objects stored in the cargo area are readily seen and may be inserted and removed therefrom. In fact, all the items in the truck bed are at risk for theft and damage. In order to carry the objects in a protected manner, people are forced to purchase or rent bulky, heavy trailers that can be difficult to pull behind the vehicle. In addition, the trailer can take up additional space in a driveway, thereby making it inconvenient to move around the trailer.

Further, in open cargo areas, item stacked above the side walls if not adequately secured may fall out of the truck bed when the vehicle is operating. Inclement weather can also damage the items stored in open cargo areas, exposing the items to moisture and other environmental conditions. Therefore, pickup truck drivers desire a sturdy and lightweight enclosure for their pickup truck beds for creating a secure and enclosed space.

Individuals, especially campers, may wish to rest or sleep in their truck beds and have the danger of being affected by inclement weather elements such as rain or snowfall and be exposed to passersby. Campers also require a secure place to use tools and may require proper ventilation such as when preparing a meal. People desire an enclosure for truck beds that provides people a secure place for taking a rest and sleeping.

Generally, the truck toppers or truck bed covers are removable and hardware tools such as releasing clamps and others are used for removing and installing the toppers on the truck bed. Usually, the truck toppers are in the range of 100-140 pounds, thus making it difficult for an individual to lift the topper alone for removal and installation. Availability of multiple people is not always feasible to install the cargo area cover, if the individual attempts to remove the topper alone, the individual can be injured and/or the topper damaged.

Therefore, there exists a long felt need in the art for a multipurpose enclosure for pickup and other truck beds. There is also a long felt need in the art for a multipurpose enclosure for vehicle, pickup and other beds or cargo areas that is used for securing items stored in the beds. Additionally, there is a long felt need in the art for a bed cover that eliminates the risk of theft or damage of items stored in a cargo area or bed. Moreover, there is a long felt need in the art for a multipurpose cargo or bed cover that is weather-tight, lightweight and modular. Further, there is a long felt need in the art for a cargo storage area that creates an enclosed space with adequate ventilation, storage and lighting. Furthermore, there is a long felt need in the art for a cargo or bed cover that can be easily installed and removed by a single person. Finally, there is a long felt need in the art for a multipurpose enclosure for cargo or beds that maximizes security for items stored in the cargo area or bed, keeping all items and tools hidden from view and secured under lock and key.

The subject matter disclosed and claimed herein, in one embodiment thereof, comprises a multipurpose hard cover assembly for making an enclosed space on a cargo area or vehicle bed. The cover assembly is configured to provide vehicles with a weather-tight, lightweight, and modular cargo storage area or workspace installed over a cargo area orbed. The cover assembly includes opposing lightweight panels releasably attachable to the opposite sides of the cargo area or bed rails using a post anchor system, where the lightweight panels are attached to a top panel, a rear panel installed on the rear wall of the bed, an aerodynamic portion positioned over the cabin area of the vehicle and releasably attached to the rear panel. One or more of the lightweight panels, include a hinged door assembly attached with one or more hinges at the edges of the lightweight panels positioned near the tailgate of the vehicle bed or other desirable areas, such as on the sides of the enclosure to gain easy access to tools or other supplies without having to enter the enclosure. The one or more hinged door assemblies is configured to prevent access to interior space formed in the vehicle cargo area or bed by the cover assembly In this manner, the multipurpose enclosure for cargo areas or beds of the present invention accomplishes all of the forgoing objectives and provides users with a modular, weather-tight, lightweight enclosure that can be used as a mobile workshop, a storage area, a sleeping area and recreational accessory. The vehicle accessory protects the items stored in the cargo area and eliminates the risk of theft or damage of items stored in the cargo area or bed. The system does not create aerodynamic drag and can be easily installed by a single person.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises a multipurpose hard cover assembly or vehicle accessory for use with a vehicle having an exposed cargo area or bed. The cover assembly or vehicle accessory is configured to provide pickup trucks and other vehicles with exposed carrying areas with a weather-tight, lightweight and modular cargo storage area or workspace installed on and over the cargo area or bed. The cover assembly further includes opposing lightweight panels that are releasably attachable to the opposite sides of the cargo area bed rails using a post anchor system of any number of posts ranging from 4 to 8 with 6 posts generally being preferred. The lightweight panels have an integrated or releasably attached slanted portion and a top horizontal portion, a rear panel installed on the rear wall of the cargo area or bed, an aerodynamic portion positioned over the passenger cabin of the vehicle and releasably attached to the rear panel and one or more said lightweight panels. One or more hinged door assemblies is attached with one or more hinges at the edges of the lightweight panels positioned on front (or near the tailgate) or on any of the sidewalls of the cargo area or bed and the hinged door assembly is configured to prevent or restrict access to the interior space formed on the cargo area or bed by the cover assembly.

In yet another embodiment, a multipurpose enclosure for use with an open cargo area or bed is disclosed. The multipurpose enclosure or vehicle accessory features a series of flat panels erected and secured on the walls of the cargo area or bed to create a private workspace or enclosure for transporting cargo and small vehicles, conducting work tasks, sleeping, and other recreational activities. The enclosure includes one or more lightweight panels, with each panel installed on each side rail of the cargo area or bed. One or more other lightweight panels is installed on opposite side rails of the cargo area or bed, and the lightweight panels installed on opposite side rails form an enclosure having side panels and a top panel, and a rear panel installed on the rear wall of the cargo area or bed. Each panel is attached to one or more opposite lightweight panels by corner or other braces. An aerodynamic component is releasably attached to the rear panel and one or more lightweight panels such that the aerodynamic components are positioned on the passenger cabin of the vehicle and reduces drag caused to the vehicle. The rear panel further includes a window or vent for ventilation, a plurality of LED lights which are installed in the enclosure for providing illumination, and a plurality of fans are installed in the enclosure for providing ventilation, cooling and or heating. The height of the enclosure measuring from the floor of the cargo area or bed to the top panel is at least six feet, thereby enabling an average height person to easily stand within the enclosure.

In yet another embodiment of the present invention, a convertible vehicle cargo area or bed cover is disclosed. The cargo area or bed cover has a series of lightweight panels capable of being erected via the mounting system that uses a post anchor system which are installed in pre-existing openings in the side rails or openings created specifically for the purpose of mounting the enclosure. The lightweight panels are erected on the side walls and rear wall of the truck bed, and an aerodynamic portion is positioned over the passenger cabin of the vehicle. An entrance on the front of the truck bed featuring a door mechanism to secure access to an enclosed space created by the series of lightweight panels. The enclosed space is created by the series of lightweight panels and the aerodynamic portion.

In yet another embodiment, the cover is weather-tight, lightweight and modular, configurable and maximizes security for items stored in the truck bed, keeping all items and tools hidden from view and secured under lock and key.

In yet another embodiment, the door mechanism includes a hinged door mechanism or a garage or roll door that rolls up in the vertical direction to open the entrance to the enclosure.

In yet another embodiment, at least one of the lightweight panels has a window and may be opened for ventilation.

In yet another embodiment, the individual lightweight panels are fastened together using mechanical fasteners or other removable fasteners to allow the enclosure to be easily disassembled.

In yet another embodiment, the lightweight panels are releasably attached to each other and to the truck bed walls.

In yet another embodiment, the lightweight panels installed on the side walls of the truck bed extend from the cabin to the front or tail gate portion of the vehicle.

In yet another embodiment, the aerodynamic portion of the cover is positioned on or about the roof surface of the passenger cabin of the vehicle in an amount ranging from between 30 to 70 percent with about 50 percent being preferred. The aerodynamic portion may be provided with suction cups, magnets or other non-invasive fasteners. The front panel of the aerodynamic portion is angled between 20 degrees and 80 degrees and preferably about 40-60 degrees.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a multipurpose enclosure for exposed cargo areas such as those found in pickup truck beds. There is also a long felt need in the art for a multipurpose enclosure for cargo areas or beds that is used for securing items stored in the cargo areas or exposed beds. Additionally, there is a long felt need in the art for a cargo area or bed cover that eliminates the risk of theft or damage of items stored in a cargo area or vehicle bed such as pickup trucks, 5-tons, cars (e.g., an El Camino or other customized automobile) SUVs, ATVs and UTVs. Moreover, there is a long felt need in the art for a multipurpose cargo area or bed cover that is weather-tight, lightweight, configurable and modular. Further, there is a long felt need in the art for a vehicle cargo storage area that creates an enclosed space with adequate ventilation and lighting. Furthermore, there is a long felt need in the art for a vehicle bed cover that can be installed and removed by a single person. Finally, there is a long felt need in the art for a multipurpose enclosure for cargo areas and vehicle beds that maximizes security for items stored in the exposed cargo area or bed, keeping all items and tools hidden from view and secured under lock and key.

The present invention, in one exemplary embodiment, is a novel convertible vehicle bed or cargo area cover for vehicles such as such as pickup trucks, 5-tons, cars, SUVs, ATVs and UTVs. The cargo or bed cover comprises of a series of lightweight panels capable of being erected via a post anchor system. The lightweight panels are erected on the side walls and rear wall of the vehicle bed, and has an aerodynamic portion positioned over the passenger cabin of the vehicle. An entrance is provided on the front or tailgate area of the vehicle bed featuring a door mechanism to secure access to an enclosed space created by the series of lightweight panels. The enclosed space is created by the series of lightweight panels and the aerodynamic portion.

Figure 1:
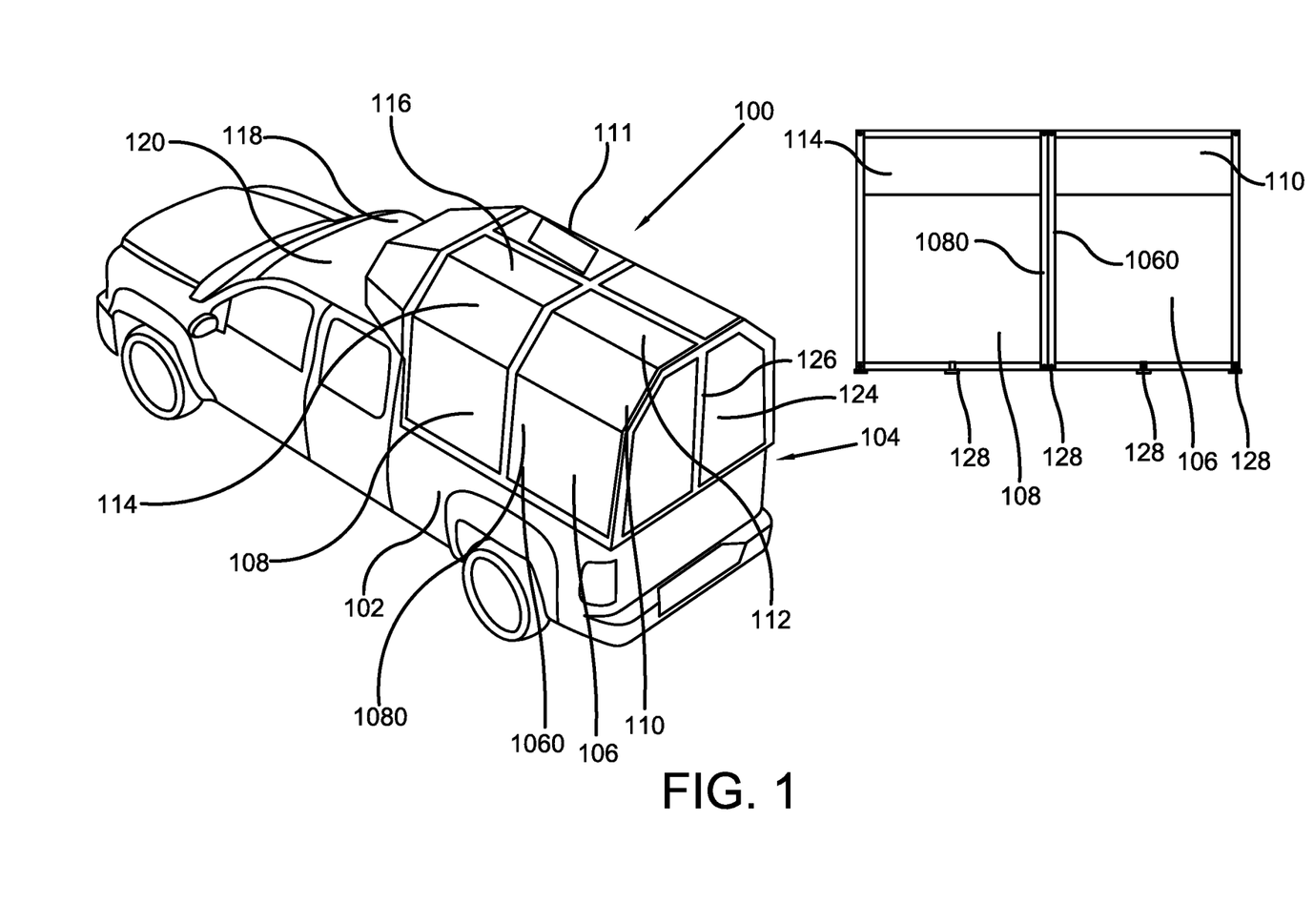
FIG. 1 illustrates a perspective view of one potential embodiment of the multipurpose exposed cargo area or bed cover of the present invention installed over a cargo area or bed in accordance with the disclosed architecture.

Referring initially to the drawings, FIG. 1 illustrates a perspective view of the multipurpose cargo area or bed cover of the present invention installed onto a conventional pickup truck bed in accordance with the disclosed specification. As shown, the multipurpose bed cover 100 is installed on the truck bed walls 102 of the pickup truck for creating a weather-tight, lightweight, configurable and modular cargo storage area or workspace installed on the truck bed 104. The cover 100 is configured to create an enclosed space with adequate lighting and ventilation for protecting the stored objects in the cargo area or bed 104 and also provides a private space for sleeping and using tools. While a pickup truck is shown in differing embodiments it is for example only and the cargo area cover may be used in connection with other vehicles, such as pickup trucks, 5-tons, cars, SUVs, ATVs and UTVs.

More specifically, the cargo or bed cover 100 has a series of lightweight panels installed on the truck bed walls 102. The panels may take any suitable shape such as square, rectangular or another geometric configuration in order to fit the particular cargo area or bed. As shown in FIG. 1, the lightweight panels 106, 108 are installed on the truck bed wall 102 and are attached together at the edges 1060, 1080. The lightweight panels 106, 108 are removably fastened to the bed wall 102 using a mounting system that includes a post anchor system 128 already integrated into all pickup trucks. The post anchor system 128 uses a series of posts that are sized and configured to openings in the walls of the cargo area or bed and between 4-8 posts may be used, with 6 being preferred. The posts are integrated with the wall panels. It should be noted that the cover 100 has a pair of similar lightweight panels (shown in FIG. 2) installed on the opposite bed wall of the truck bed 104. As illustrated, a slanted panel 110 extends upwards from the lightweight panel 106 and a top horizontal panel 112 extends from the slanted panel 110. Similarly, a second slanted panel 114 extends upwards from the lightweight panel 108 and a top horizontal portion 116 extends horizontally from the second slanted panel 114. Symmetrical lightweight panels are positioned on the opposite wall of the truck bed to form an enclosed space to cover the cargo area or bed 104. The lightweight panels 106, 110, 112 can be designed as separate components that are releasably connected together using mechanical fasteners or can be designed as a one-unit integrated lightweight panel based on the preference of the user. One or more skylights 111 may be provided in the roof 116 so as to allow in natural light. The skylights 111 may also be capable of opening for ventilation purposes.

Figure 2:
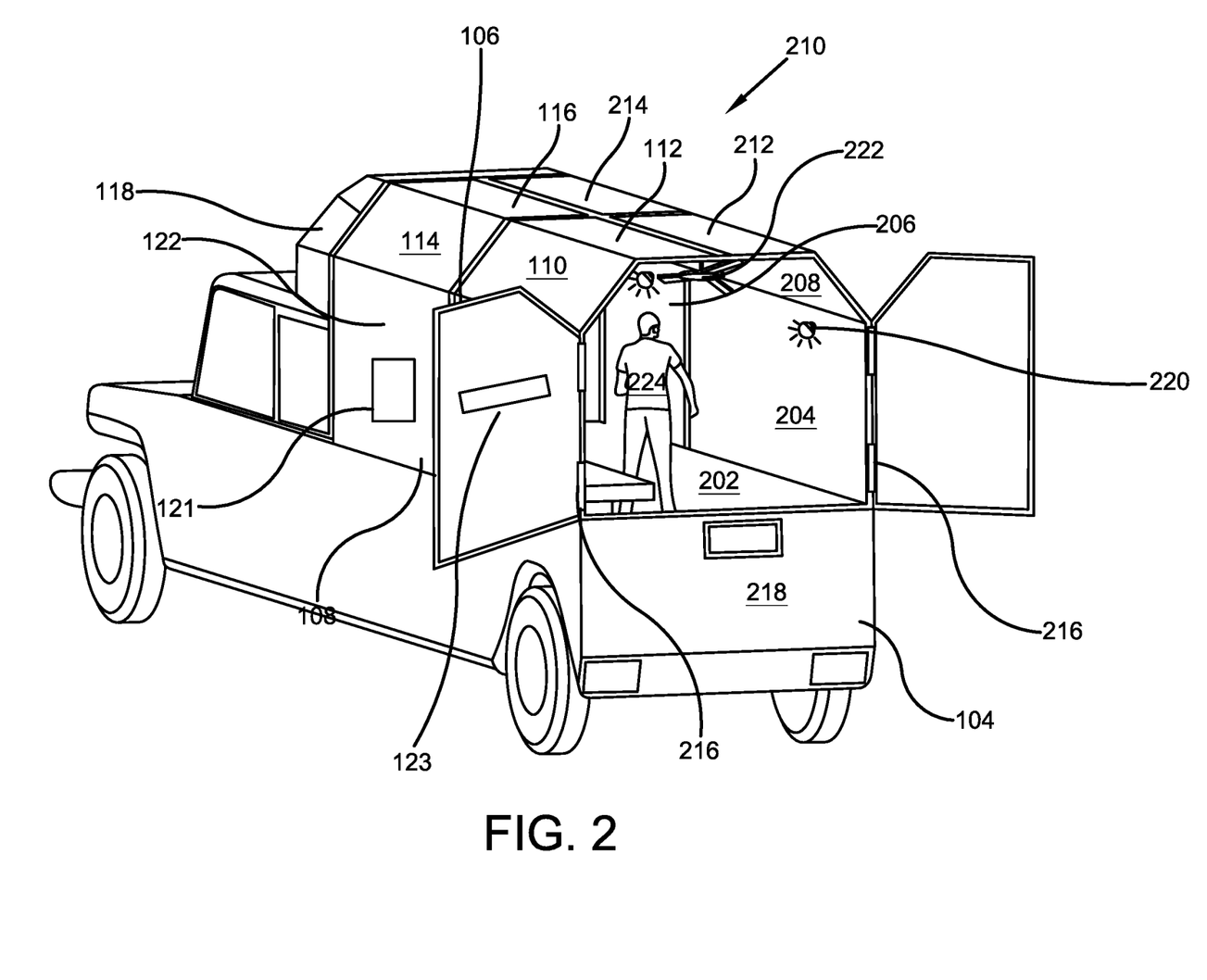
FIG. 2 illustrates a perspective view showing the interior space of one potential embodiment of the multipurpose exposed cargo area or bed cover of the present invention with an open hinged door in accordance with the disclosed architecture.

The enclosed cover 100 has an aerodynamic edge 118 positioned over the pickup truck passenger cab 120. The cab over portion 120 is configured to be a removable portion of the enclosed cover 100 and reduces the potential drag that may be caused due to the cover 100. The cab over portion 120 may use suction cups, magnets or other non-invasive fasteners 119 (see FIG. 4) to help hold the cap over portion in position and prevent lift of the edge. The cover 100 also has a rear cap panel 122 as shown in FIG. 2 to form the enclosed space. The cover 100 also has a hinged door 124 for protecting the entrance of the cover 100. The door 124 is configured to be locked at the central portion 126 to secure the enclosed space. Additional details of the door 124 are provided in FIG. 2.

FIG. 2 illustrates a perspective view showing the interior space of the cargo area or bed cover 100 with an open hinged door in accordance with the disclosed structure. The interior space 202 is created by a pair of lightweight panels 106, 108, a second pair of lightweight panels 204, 206, the slanted panels 110, 114, 208, 210 and top horizontal or roof panels 112, 116, 212, 214 along with the rear cap panel 122, the aerodynamic front edge 118 and the door 124. One or more of the panels may be provided with a window 121 to allow light into the interior of the enclosure as well as to provide ventilation.

As stated earlier, the lightweight panels 106, 108 and second pair of lightweight panels 204, 206 are symmetrical to each other and are fixed to opposite truck bed walls. Similarly, the slanted panels 110, 114 are symmetrical and opposite to the second pair of slanted panels 208, 210 and the top horizontal or roof panels 112, 116 are symmetrical and opposite to the second pair of top horizontal or roof panels 212, 214. The pair of hinged doors 124 are attached with one or more hinges 216 at the front or tailgate end 218 of the truck bed 104. The pair of hinged doors 124, in the present embodiment are adapted to swing outward and inward. One or more of the doors 124 may have slots 123 that can be used to insert items into the enclosure without opening the doors or for additional light or ventilation.

The cover 100 has the dimensions that provide the interior space 202 for an average height person 224 to comfortably stand. Preferably, the cover 100 has a maximum depth of 6" measuring from the bed or floor surface to the top horizontal panels or roof. Further, for providing adequate illumination during low light situations inside the enclosure, the cover 100 provides a plurality of LEDs 220 powered by electric power of the pickup truck or an auxiliary battery. For providing ventilation, at least one fan 222 is positioned inside the cover. The fan 222 also runs on the power provided by the vehicle.

Figure 3:
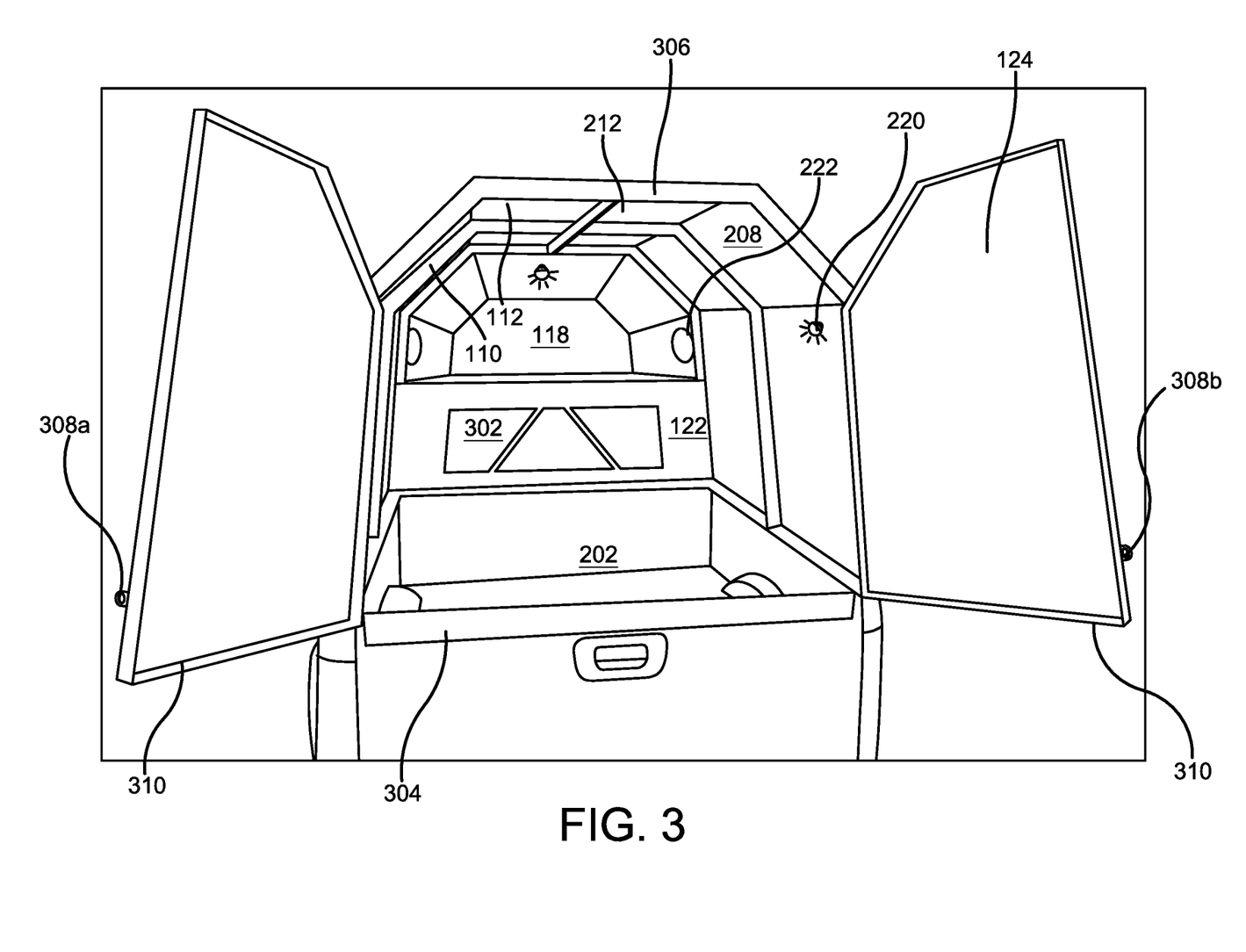
FIG. 3 illustrates a front perspective view of one potential embodiment of the multipurpose convertible cover of the present invention installed over an exposed cargo area or bed in accordance with the disclosed architecture.

FIG. 3 illustrates a front perspective view of the multi-purpose convertible cover 100 installed on the vehicle bed and over an exposed cargo area in accordance with the disclosed specification. As shown, the aerodynamic edge 118 is positioned on the truck cabin and is releasably fastened to the lightweight panels that are positioned near to the cabin of the vehicle. The edge 118 is configured to provide additional space for storage of tools and other items in addition to providing protection against aerodynamic drag. The rear cap panel 122 is also a lightweight panel and positioned on and above the rear wall of the truck bed. The rear cap panel 122 has a transparent and sliding window 302 for providing additional ventilation to a user inside the cover. A plurality of LEDs 220 and a plurality of fans 222 are removably placed inside the cover 100 for providing illumination and ventilation.

For closing the pair of hinged doors 124, the front/tailgate end 218 of the truck bed has a rubber layer or seat 304 for sealing the bottom end 310 of the pair of the hinged door 124. This eliminates dirt and any other weather elements being able to pass through the door and enter the enclosure. Similarly, on closing, the pair of hinged doors 124 abuts the front wall 306 of the panels 110, 112, 212, 208. The hinged doors have a lock mechanism 308a, 308b for securing the interior space and the items stored within the interior space of the cover by lock and key.

Figure 4:
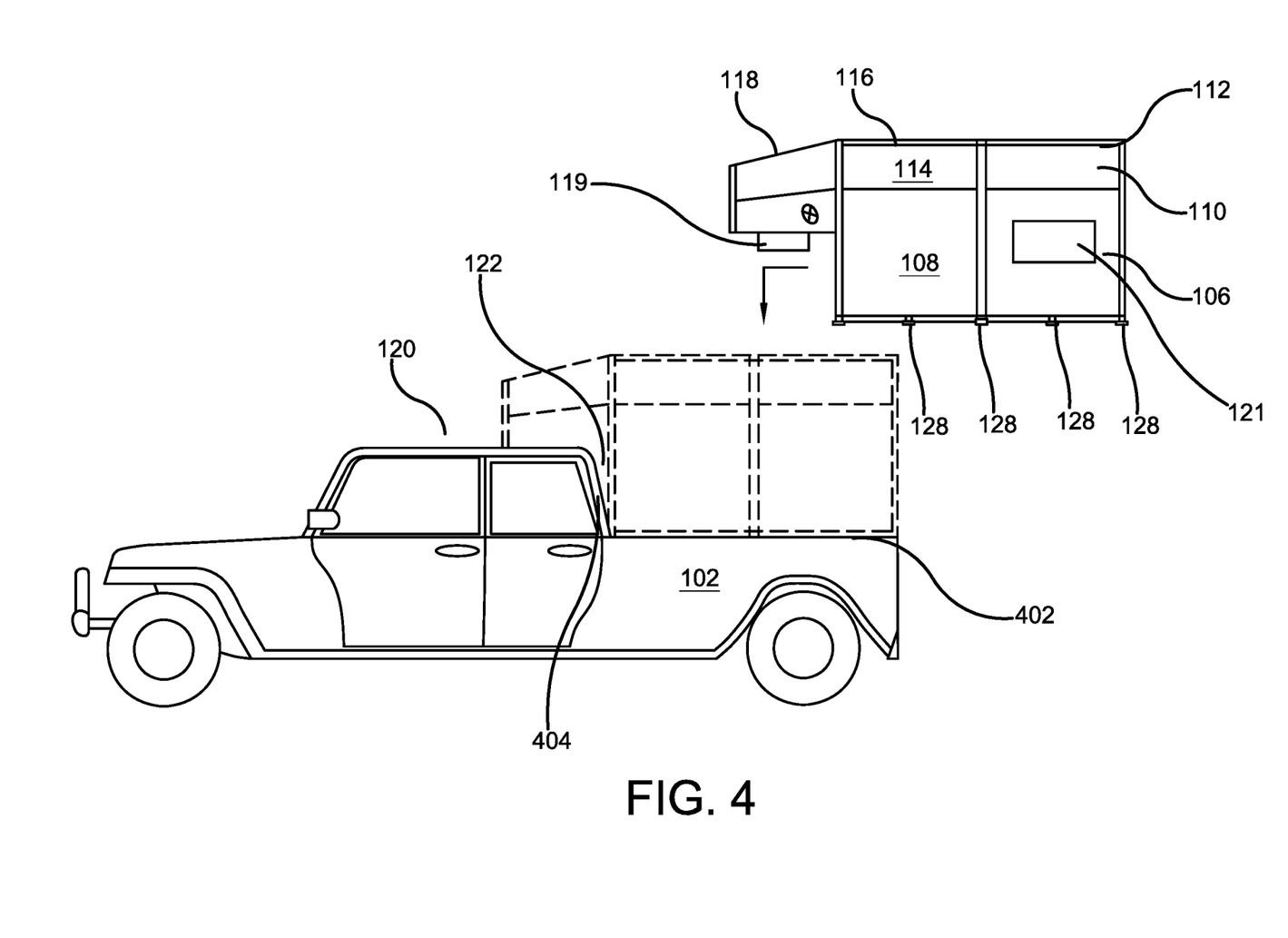
FIG. 4 illustrates a side perspective view of a vehicle, such as a pickup truck, and one potential embodiment of the multipurpose cargo area or bed cover of the present invention and showing the position of placement of the panels on the cargo area or bed frame and passenger cabin in accordance with the disclosed architecture.

FIG. 4 illustrates a side perspective view of the pickup truck and multipurpose vehicle bed cover 100 showing the position of placement of the panels on the truck bed and cabin in accordance with the disclosed structure. The advantage of the cargo or bed cover 100 of the present invention is that the cover 100 is modular, configurable and can be broken down into smaller sections easily and quickly for transportation and storage purposes. The cover 100 can also be installed in a short period by a single person and create an enclosure and private space within the cargo area of the bed 104. The walls 102 have rails 402 that are used for installing the lightweight panels using the post anchor system 128 that is already integrated into all pickup trucks or which may be added by the owner of the vehicle at a later date. The vertical or erect light panels 106, 108 are positioned on the rail 402 and slanted panels 110, 114 and top horizontal or roof panels 112, 116 are attached to the light panels 106, 108 respectively using mechanical fasteners. FIG. 4 also shows the non-invasive fastener 119 for securing the cab over portion to the vehicle roof. The fasteners 119 may be magnets, suction cups, removable or repositionable adhesive or combinations thereof to prevent the cab over portion from lifting up when the vehicle is in motion. One or more windows 121 may be provided in any of the side walls of the enclosure 100.

The lightweight panels 106, 108 can be separately attached to the rail 402 or can be attached to each other first and then installed on the rail 402. Similarly, the aerodynamic edge portion 118 is fastened to the lightweight panel 108, slanted panel 108 and top panel 116 and is positioned on the cabin 120. The rear cap panel 122 covers the rear wall 404 of the truck bed 104 and extends to the inner housing of the aerodynamic edge portion 118.

Figure 5:
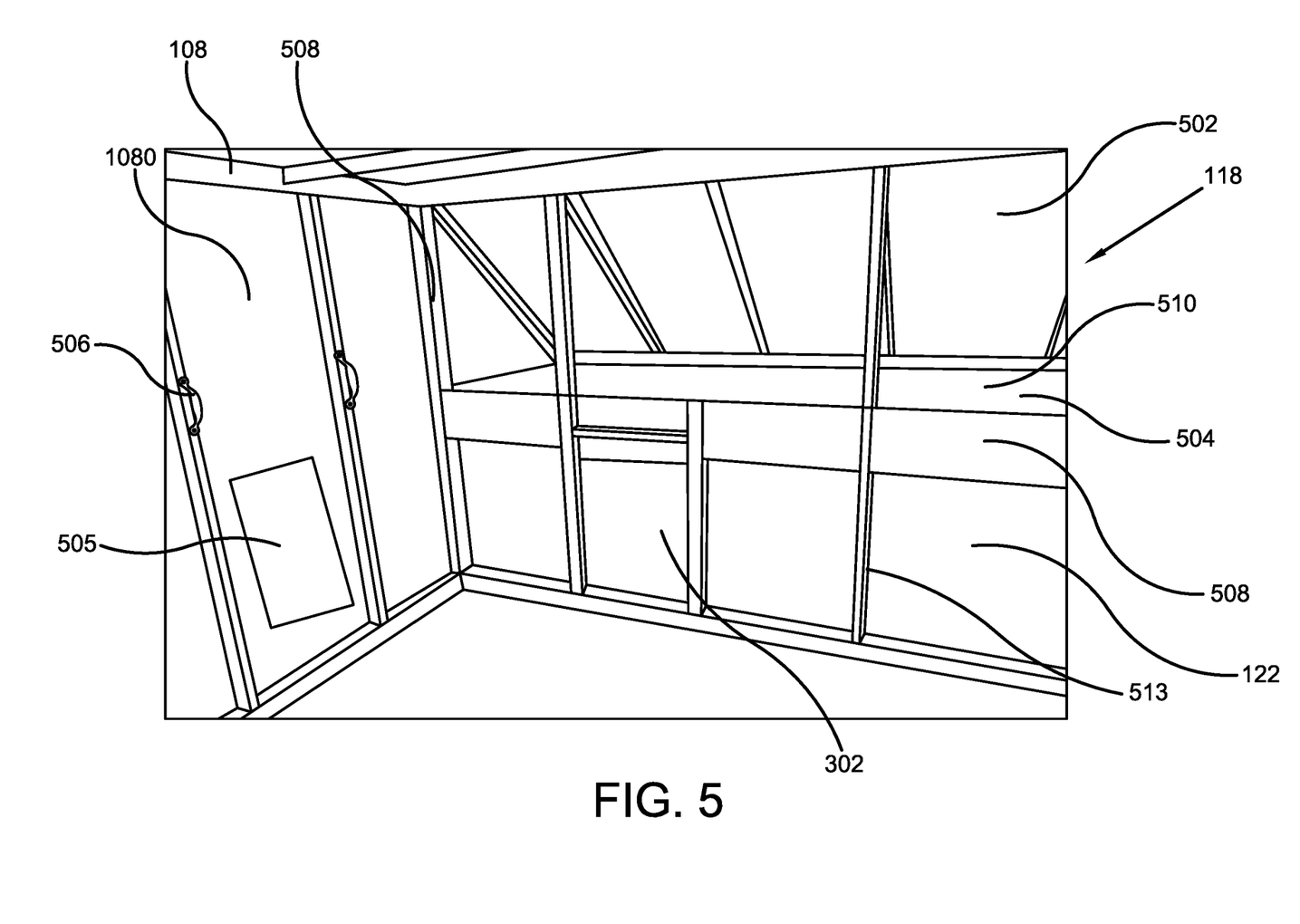
FIG. 5 illustrates a close-up view of the aerodynamic edge and its connection with the rear wall cap and the lightweight panel in accordance with the disclosed architecture.

FIG. 5 illustrates a close-up view of the aerodynamic edge 118 and its connection with the rear wall cap 122 and the lightweight panel or front 108 which is adjacent to the passenger cabin in accordance with the disclosed specification. As stated earlier, the aerodynamic edge portion 118 is positioned on the cab over portion of the passenger compartment of the vehicle and is used for providing additional space 504 for storing items such as tools 510 and others. The aerodynamic edge portion 118 has a downward slanting plane 502 which directly extends to the cabin or has a vertical portion extending to the cabin. The angle of the slanting plane ranges from 20 to 80 degrees with about 40 to 60 degrees for an angle of the slant being preferred. The angle of the slant is determined by the height of the enclosure 100.

The aerodynamic portion 118 is releasably fastened to the rear panel 122 along the top edge of the rear panel 122 using mechanical fasteners 508 such as screws or clips. Similarly, the aerodynamic portion 118 is releasably fastened to the lightweight or front panel 108 may also have a door 505 which can be used by the passenger cabin occupants to reach into the enclosure from a sliding window in the passenger cabin. such that the aerodynamic portion 118 remains secured when the pickup truck on which the aerodynamic portion 118 is mounted is traveling at a high speed.

Also, in FIG. 5, the window 302 of the rear panel 122 is shown which is provided for ventilation. The lightweight panel 108 may have one or more window portions 1080 having a handle 506. The handle 506 can be used for opening the window portion 1080 for ventilation and additional light. The enclosure is held together by framing elements 513 which may be wood or lightweight metal such as aluminum, carbon fiber stud or any combination thereof.

Figure 6:
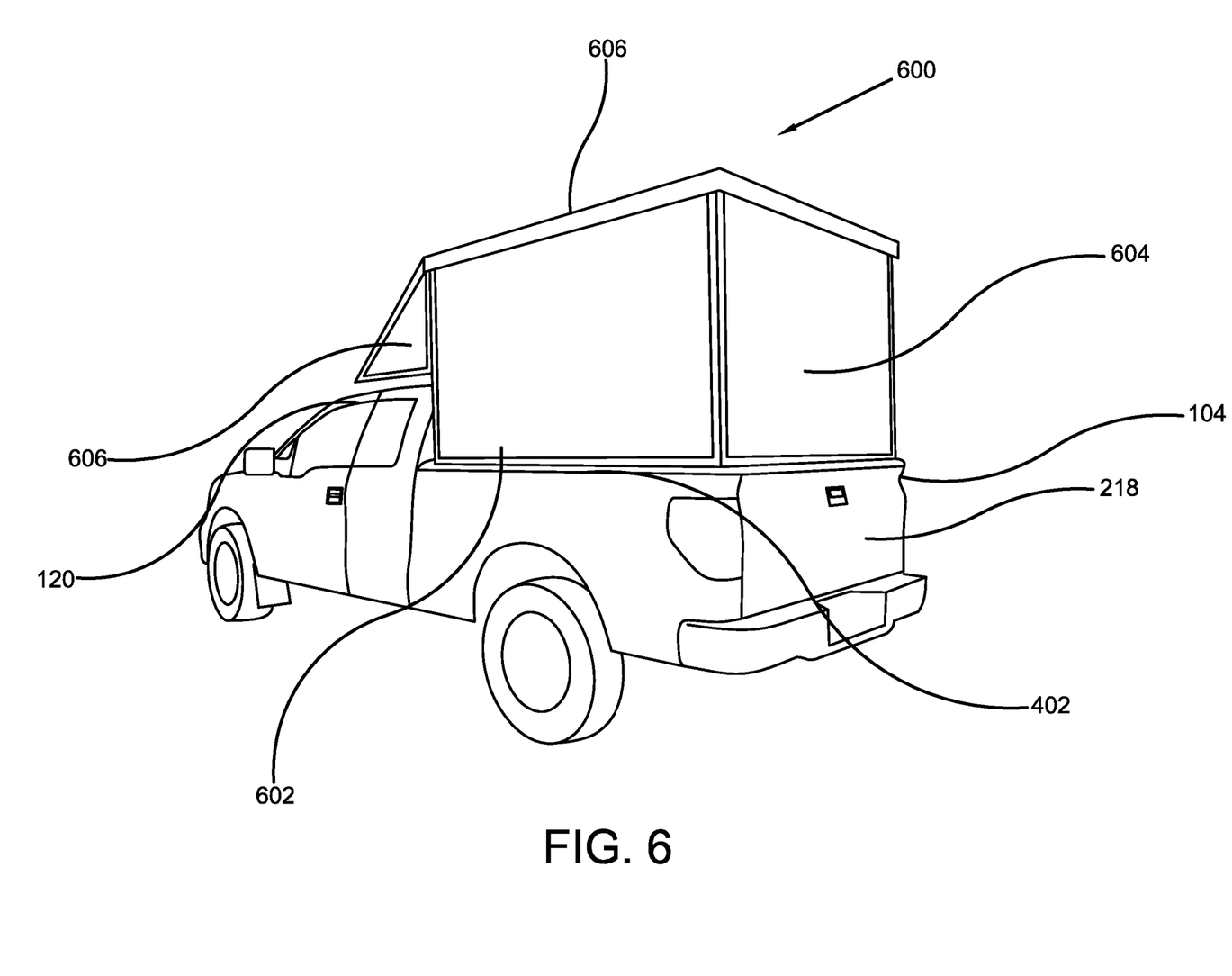
FIG. 6 illustrates a perspective view of another potential embodiment of the multipurpose cargo area or bed cover of the present invention installed onto a conventional pickup truck bed in accordance with the disclosed architecture.

FIG. 6 illustrates a perspective view of another embodiment of the multipurpose cargo area or bed cover of the present invention installed on a conventional pickup truck bed in accordance with the disclosed specification. In the present embodiment, the side rails 402 of the pickup truck bed 104 have vertical panels 602 with a top panel 606 releasably attached to the vertical panels 602. At the tailgate end 218 of the truck, a rolling or hinged door 604 is positioned that is configured to be opened for providing access to the interior space of the cover 600. The cover 600 of the present embodiment also has an aerodynamic portion

606 which is triangular in shape and is positioned on the cabin 120 of the truck to reduce aerodynamic drag and increase storage space in the truck bed. The door 604 is configured to have an opening and closing mechanism similar to that of a garage door that rolls up in the vertical direction to open. The vertical dimension of the cover 600 is tall enough for an average height person to comfortably stand up inside of the device.

One or more lightweight panels or any other panel of the cover 100, 600 can have windows and can be made from a durable and lightweight material such as wood, lightweight metal, durable plastic and more. Further, any portion of the panels can be transparent or translucent as per preference of a user.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "convertible pickup truck bed cover", "multipurpose enclosure", "multipurpose hard cover assembly", "enclosure cover", "multipurpose truck bed cover", "truck bed cover" and "cover" are interchangeable and refer to the c multipurpose truck bed cover 100 of the present invention.

Notwithstanding the forgoing, the multipurpose truck bed cover 100 of the present invention can be of any suitable size and configuration as is known in the art without affecting the overall concept of the invention, provided that it accomplishes the above-stated objectives. One of ordinary skill in the art will appreciate that the multipurpose truck bed cover 100 as shown in the FIGS. are for illustrative purposes only, and that many other sizes and shapes of the multipurpose truck bed cover 100 are well within the scope of the present disclosure. Although the dimensions of the multipurpose truck bed cover 100 are important design parameters for user convenience, the multipurpose truck bed cover 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A combination vehicle bed and enclosure comprising:
   a vehicle having a cargo bed, the cargo bed having side walls, a tailgate at a first end and a wall of a passenger cabin at another end opposite the first end;
   an enclosure formed from lightweight panels forming side wall and horizontal panels forming a roof;
   at least one of the lightweight panels having a door and at least one of the lightweight panels having a window;
   a mounting system for mounting the enclosure on the sidewalls of the vehicle cargo bed and the mounting system including a number of posts; and
   an aerodynamic portion removably attached to the enclosure, wherein the aerodynamic portion include non-invasive fasteners to hold the aerodynamic portion to a roof of the passenger cabin.

2. The combination vehicle bed and enclosure as recited in claim 1, wherein the number of posts ranges from four to eight posts and the posts are sized to fit within openings in the side walls of the cargo bed.

3. The combination vehicle bed and enclosure as recited in claim 1, wherein the non-invasive fasteners are selected from a group consisting of a magnet, a suction cup, a removable or repositionable adhesive or a combination thereof.

4. The combination vehicle bed and enclosure as recited in claim 1, wherein the enclosure is held together by framing elements selected from one of a wood, an aluminum, a carbon fiber or a combination thereof.

5. A cover for a pickup truck bed, the cover comprising:
   an enclosure constructed from a plurality of lightweight panels held together by a plurality of framing elements, horizontal panels forming a roof connected to the plurality of lightweight panels and a front and back panel forming the enclosure;
   a mounting system using a post anchor system and having between 4 and 8 posts for insertion into slots in the pickup truck bed;
   at least one door provided in one of the front or back panels;
   at least one window provided in the plurality of lightweight panels; and
   an aerodynamic portion removably attached to the enclosure, wherein the framing elements are selected from one of a wood, an aluminum, a carbon fiber stud or a combination thereof, and further wherein the aerodynamic portion is attached to the enclosure by a plurality of non-invasive fasteners.

* * * * *